United States Patent
Rui et al.

(10) Patent No.: US 7,231,064 B2
(45) Date of Patent: *Jun. 12, 2007

(54) MODE-BASED MULTI-HYPOTHESIS TRACKING USING PARAMETRIC CONTOURS

(75) Inventors: Yong Rui, Sammamish, WA (US); Yunqiang Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 78 days.

This patent is subject to a terminal disclaimer.

(21) Appl. No.: 11/282,365

(22) Filed: Nov. 17, 2005

(65) Prior Publication Data

US 2006/0078163 A1    Apr. 13, 2006

Related U.S. Application Data

(63) Continuation of application No. 10/164,947, filed on Jun. 7, 2002, now Pat. No. 6,999,599.

(51) Int. Cl.
*G06K 9/00* (2006.01)
(52) U.S. Cl. ..................................................... 382/103
(58) Field of Classification Search ................ 382/103, 382/107, 254, 256
See application file for complete search history.

(56) References Cited

U.S. PATENT DOCUMENTS 5,926,568 A * 7/1999 Chaney et al. .............. 382/217
5,999,651 A * 12/1999 Chang et al. ................ 382/215
6,542,621 B1 * 4/2003 Brill et al. ................... 382/103
6,826,292 B1 * 11/2004 Tao et al. .................... 382/103
6,999,599 B2 * 2/2006 Rui et al. .................... 382/103

* cited by examiner

*Primary Examiner*—Matthew C. Bella
*Assistant Examiner*—Tom Y. Lu
(74) *Attorney, Agent, or Firm*—Lyon & Harr, LLP; Mark A. Watson

(57) ABSTRACT

A system and method for object tracking using probabilistic mode-based multi-hypothesis tracking (MHT) provides for robust and computationally efficient tracking of moving objects such as heads and faces in complex environments. A mode-based multi-hypothesis tracker uses modes that are local maximums which are refined from initial samples in a parametric state space. Because the modes are highly representative, the mode-based multi-hypothesis tracker effectively models non-linear probabilistic distributions using a small number of hypotheses. Real-time tracking performance is achieved by using a parametric causal contour model to refine initial contours to nearby modes. In addition, one common drawback of conventional MHT schemes, i.e., producing only maximum likelihood estimates instead of a desired posterior probability distribution, is addressed by introducing an importance sampling framework into MHT, and estimating the posterior probability distribution from the importance function.

20 Claims, 5 Drawing Sheets

  
FIG. 4A          FIG. 4B          FIG. 4C
  
FIG. 4D          FIG. 4E          FIG. 4F
  
FIG. 5A          FIG. 5B          FIG. 5C
  
FIG. 5D          FIG. 5E          FIG. 5F

MODE-BASED MULTI-HYPOTHESIS TRACKING USING PARAMETRIC CONTOURS

CROSS REFERENCE TO RELATED APPLICATIONS

This application is a Continuation Application of U.S. patent application Ser. No. 10/164,947, filed on Jun. 7, 2002 now U.S. Pat. No. 6,999,599 by Yong Rui and Yunqiang Chen, and entitled "A SYSTEM AND METHOD FOR MODE-BASED MULTI-HYPOTHESIS TRACKING USING PARAMETRIC CONTOURS".

BACKGROUND

1. Technical Field

The invention is related to a system for tracking objects, and in particular, to a system and method for real-time probabilistic mode-based multi-hypothesis tracking using parametric causal contour models.

2. Related Art

Accurate tracking of the objects, such as, for example, the human head and face is an important application of object tracking. For example, the ability to track moving people in video surveillance and video conferencing systems greatly increases the utility of such systems. Unfortunately, robust and efficient tracking of human heads and faces in complex environments is a problem which has not been adequately addressed by existing tracking schemes.

In general, the basic objective of most conventional tracking schemes is to accurately and efficiently compute a posterior probability of a tracking state for a target object or objects with respect to an image observation. With respect to heads and faces, the tracking state typically represents information such as, for example, location and orientation of the head or face. Given this basic objective, there are three general approaches to estimating a probability distribution, i.e., pure parametric, pure non-parametric and semi-parametric.

The well-known Kalman filter is a good example of the pure parametric approach, where the distribution is assumed to be Gaussian. Unfortunately, because of its uni-mode assumption, the use of Kalman filters has only achieved limited success in real-world tracking applications. To overcome this difficulty, one conventional scheme uses a nonparametric approach wherein the object tracking probability distribution is represented and estimated by a set of properly positioned and weighted "particles." The scheme works with both multi-mode distributions and non-linear dynamic systems. However, as with most if not all non-parametric algorithms, this scheme requires a large number of particles. Further, the required number of particles grows exponentially with the dimensionality of the state space. Unfortunately, as the number of particles increases, so does the computational complexity and cost of solving the tracking problem.

Several other conventional schemes have attempted to address the problem of needing large numbers of particles for tracking by simply making the particles more effective. For example, one such scheme uses an annealed particle filter for tracking an articulated human figure. This scheme is based on probabilistic pruning, and focuses its particles in a neighborhood around global peaks of the weighting function. While this scheme greatly reduces the number of particles needed, it achieves this result at the cost of sacrificing robustness in a Bayesian framework. In particular, by discarding inferior peaks in the weighting function, this scheme can lose the true state of the object being tracked when large distractions or discontinuities occur in the observation data.

Several other conventional schemes have attempted to address the problem of needing large numbers of particles for tracking by using a semi-parametric approach where the probability distribution to be estimated is modeled by a mixture of parametric distributions. These semi-parametric approaches retain the capability of representing multi-mode distributions, but with much fewer samples or particles. In particular, one of the most successful semi-parametric schemes used in object tracking is known as multi-hypothesis tracking (MHT).

MHT was first developed in radar-tracking systems. However, one conventional scheme has successfully applied MHT in articulated human body tracking. MHT works in a parametric state space. Each hypothesis is a particular configuration of parameters in the state space, and the overall state is represented by a mixture of multiple hypotheses. One limitation with the classic MHT, as used in radar tracking, is that it assumes that a set of discrete hypotheses is available at any time step. This assumption is valid in radar tracking where the goal is to associate multiple detected targets with multiple airplanes, missiles, spacecraft, etc. However, in visual tracking, this assumption cannot easily be met. For example, for human head tracking, it would be extremely difficult to develop a single high-level "feature detector" that can detect a set of discrete hypotheses of the head position/pose at every frame. On the other hand, using low-level features such as image edges in this scheme quickly leads to an intractable number of hypotheses.

Another conventional scheme addresses this particular difficulty by first using an appearance-based gradient local search to generate a set of hypotheses (local maximums), and then constructing a likelihood function as a piecewise Gaussian by combining the multiple hypotheses. While this approach has successfully demonstrated the effectiveness of the MHT paradigm in visual tracking, it has three major difficulties. First, for visual tracking, the appearance or template-based approaches only work with relatively rigid objects and with objects that rarely change orientation and intensity. For head tracking, however, the head orientation and environmental lighting can change from frame to frame, causing head appearance change dramatically. Second, this scheme uses an iterative Gauss-Newton method to generate hypotheses, which is both computationally expensive and unsuitable for real-time tracking. Finally, and most importantly, while this scheme produces maximum likelihood estimates, it does not compute the posterior probability of the tracking state with respect to the image observation. As a result, the tracking performance of this scheme can be significantly degraded.

Therefore, what is needed is a system and method for tracking objects such as heads and faces that is both robust in complex environments and computationally efficient. Further, this system and method should be capable of tracking objects wherein the appearance is capable of changing from one image frame to the next. In addition, this system and method should be capable of using multi-hypothesis tracking while also computing a posterior probability of the tracking state with respect to image observations.

SUMMARY

A system and method for object tracking as described herein solves the aforementioned problems, as well as other problems that will become apparent from an understanding of the following description by providing a novel probabilistic mode-based multi-hypothesis tracking (MHT) system for tracking moving objects. A mode-based multi-hypothesis tracker, as described herein, is both robust in complex environments, such as, for example, cluttered backgrounds, partial occlusion, and changing lighting conditions, and computationally efficient. Further, the mode-based multi-hypothesis tracker is capable of tracking any object that can be modeled using parametric contours. For example, objects that can be modeled using parametric contours include vehicles, such as cars, aircraft, missiles, boats, etc., animals, people, including the heads, faces, arms legs, hands and fingers of those people, or any other object than can be modeled using parametric contours. It should be noted that for purposes of explanation, the mode-based multi-hypothesis tracker is described herein with respect to tracking of human heads and faces, but that the techniques described are equally applicable to tracking any other desired object.

Note that the following discussion makes use of the terms "sample" and "mode." In the context of the following discussion, "sample" is used to denote a state space configuration obtained from some prior distribution or prediction scheme. "Mode" is used to denote a refined "sample" that corresponds to a local maximum in the distribution. Note that both "sample" and "mode" represent a particular configuration of parameters in the state space.

In general, unlike conventional MHT schemes, the mode-based multi-hypothesis tracker described herein uses parametric contours, instead of object appearance, to model an object of interest. This is particularly effective in head tracking, where the head can be effectively modeled by a parametric ellipse. While the head orientation and lighting can dramatically change the head appearance, the contour of the head remains approximately the same shape. Further, in one embodiment, computationally efficient real-time tracking capability is achieved through the use of a novel causal contour model which avoids the necessity of iterative model refinement. Finally, the capability to compute a posterior probability of the tracking state $X_t$ with respect to an image observation $Z_t$ at time t, is added to MHT by placing the MHT technique into an importance sampling framework so as to effectively estimate the desired posterior $p(X_t|Z_t)$.

Specifically, the mode-based multi-hypothesis tracker tracks at least one object through a sequence of images. The assumption is made that in the first frame, the location and contour of the object or objects is known to the mode-based multi-hypothesis tracker. In other words, a "sample" denoting a particular state space configuration obtained from a prior distribution or prediction scheme is known with respect to the first frame. Any of a number of conventional techniques is used to locate the object in the initial image frame. For example, such techniques include edge detection, the use of color or intensity gradients, manual identification of the initial location, or any other conventional prior distribution or prediction scheme. The mode-based multi-hypothesis tracker then tracks the object or objects throughout the remaining sequence of images in the manner described below.

In particular, given the initial sample, a sequence of image frames is then provided for processing by the mode-based multi-hypothesis tracker. Using this sample, the mode-based multi-hypothesis tracker then determines at least one corresponding mode for an input image frame. In other words, given the initial sample, the mode-based multi-hypothesis tracker determines one or more "modes" that correspond to local maximums in the distribution. Finally, after determining the mode having the highest estimated posterior $p(X_t|Z_t)$, that mode is provided as the current target estimate, and is then used as the "sample" for processing the next sequential image.

In one embodiment, given an initial sample, a number of likely modes are first determined or "refined" from an image using a conventional "active contour" technique by performing an iterative search in a 2D image plane. Conventional active contour techniques provide a deformable curve, or "snake", which moves over an image while minimizing its potential energy. The energy of a snake can in general be divided into an "internal energy" term constraining the overall shape of the snake, and an "external energy" function provided by the image driving the snake towards a desired boundary. With an appropriate image energy function and careful initialization, a snake can converge effectively to the required boundary, thereby generating one or more modes.

Unfortunately, the modes returned by conventional active contour techniques only represent maximum likelihood estimates as the active contour technique converges on a target object boundary. Consequently, the mode-based multi-hypothesis tracker described herein expands on the conventional active contour technique by utilizing these modes to generate an "importance sampling function." Samples or "particles" are then drawn from the importance function. Weights for these particles are then computed. Finally, the weighted particles are then used for computing a posterior probability of a tracking state with respect to an image observation for each image frame.

While the aforementioned embodiment is useful for robust tracking of objects, it is not necessarily efficient enough to allow for real-time object tracking. Consequently, in another embodiment of the mode-based multi-hypothesis tracker, a 1D causal contour model is used in place of the iterative search of the 2D image plane to facilitate efficient sample refinement in identifying likely modes. As with the iterative search of the 2D image plane, the use of a 1D contour model for identifying likely modes, is followed by the generation of an importance sampling function, weighting particles drawn from the importance function, and using the weighted particles for computing a posterior probability of a tracking state with respect to an image observation for each image frame. One benefit of using the 1D causal contour model in place of the iterative search of the 2D image plane is that image processing speed in increased to the extent where real-time object tracking is easily feasible on a typical PC-type computer.

Further, in still another embodiment, the robustness of the mode-based multi-hypothesis tracker is improved by a further refinement of the contour model. In particular, the contour model, whether using a 2D model, or the aforementioned 1D causal contour model, is further refined by using a parametric contour as the state space so as to take domain knowledge such as a shape prior into account. Using parametric contours in this manner serves to avoid or further reduce errors resulting from background distraction or discontinuities in the images. For example, in the case of human head tracking, a parametric ellipse is used as the as the state space. Clearly, parametric contours other than ellipses can be used, with the type of parametric contour being chosen that best represents the object or objects being tracked in the images.

In view of the preceding discussion, it is clear that the mode-based multi-hypothesis tracker described herein is advantageous for use in real-time tracking of any object which can be modeled using a parametric contour. In addition to the just described benefits, other advantages of the mode-based multi-hypothesis tracker described herein will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 4A through FIG. 4C illustrate tracking of a human head in various poses through a sequence of images using a mode-based multi-hypothesis tracker with a fitted parametric ellipse.

FIG. 4D through FIG. 4F illustrate tracking of a human head in various poses through a sequence of images using a mode-based multi-hypothesis tracker with a fitted parametric ellipse, wherein the head being tracked is partially occluded by another human head.

FIG. 5A through FIG. 5C illustrate tracking of a human head in various poses through a sequence of images using a mode-based multi-hypothesis tracker, wherein the head being tracked moves across sharp boundaries representative of background clutter.

FIG. 5D through FIG. 5F illustrate tracking of a human head in various poses by a conventional non-parametric contour-based tracking scheme through the same sequence of images illustrated in FIG. 5A through FIG. 5C.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
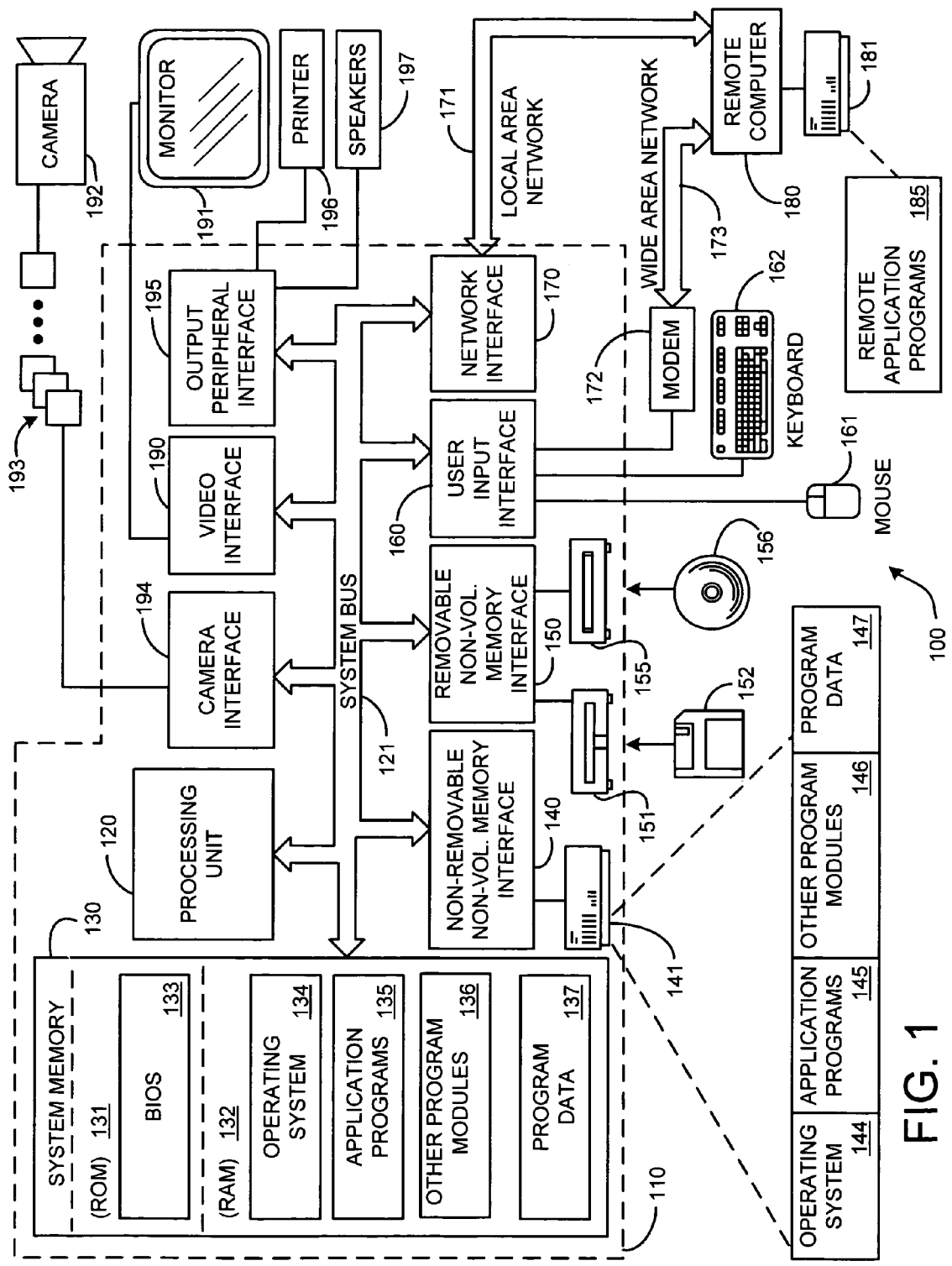
FIG. 1 is a general system diagram depicting a general-purpose computing device constituting an exemplary system for using a mode-based multi-hypothesis tracker to track objects.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying use of a mode-based multi-hypothesis tracker for tracking objects of interest in one or more sequences of images.

2.0 Introduction:

The mode-based multi-hypothesis tracker described herein uses a mode-based multi-hypothesis tracking (MHT) system in combination with an importance sampling function for estimating a posterior probability distribution of a tracking state with respect to an image observation to provide robust tracking of moving objects in one or more sequences of images. The mode-based multi-hypothesis tracker is useful for tracking objects in complex environments, such as, for example, cluttered backgrounds, partial occlusion, and changing lighting conditions. Further, the mode-based multi-hypothesis tracker is computationally efficient.

The mode-based multi-hypothesis tracker is capable of tracking any object that can be modeled using parametric contours. For example, objects that can be modeled using parametric contours include vehicles, such as cars, aircraft, missiles, boats, etc., animals, people, including the heads, faces, arms legs, hands and fingers of those people, or any other object than can be modeled using parametric contours. It should be noted that for purposes of explanation, the mode-based multi-hypothesis tracker is described herein with respect to tracking of human heads and faces, but that the techniques described are equally applicable to tracking any other desired object.

Finally, it should also be noted that the following discussion uses the terms "sample" and "mode." In the context of the following discussion, "sample" is used to denote a state space configuration obtained from a prior distribution. "Mode" is used to denote a refined "sample" that corresponds to a local maximum in the distribution. Note that both "sample" and "mode" represent a particular configuration of parameters in the state space.

2.1 System Overview:

The mode-based multi-hypothesis tracker, as described herein, uses modes that are local maximums in a distribution that is refined from initial samples in a parametric state space. Because the modes are highly representative, the mode-based multi-hypothesis tracker effectively models non-linear probabilistic distributions using a small number of hypotheses. Real-time tracking performance is achieved by using a parametric causal contour model to refine initial contours to nearby modes. In addition, one common drawback of conventional MHT schemes, i.e., producing only maximum likelihood estimates instead of a desired posterior probability distribution of a tracking state with respect to an image observation, is addressed by introducing an importance sampling framework into MHT, and estimating the posterior probability distribution from the importance function.

In general, unlike conventional MHT schemes, the mode-based multi-hypothesis tracker described herein uses parametric contours, instead of object appearance, to model an object of interest. This is particularly effective for tracking objects which can be modeled using parametric contours, such as, for example human head and face tracking, where the head can be effectively modeled by a parametric ellipse. While the head orientation and lighting can dramatically change the head appearance between image frames, the contour of the head remains approximately the same shape.

Further, in one embodiment, computationally efficient real-time tracking capability is achieved through the use of a novel causal contour model which avoids the necessity for iterative model refinement. Finally, the capability to compute a posterior probability of the tracking state $X_t$ with respect an image observation $Z_t$ at time t, is added to MHT by placing the MHT technique into an importance sampling framework so as to effectively estimate the desired posterior $p(X_t|Z_t)$.

Specifically, the mode-based multi-hypothesis tracker tracks at least one object through a sequence of images. The assumption is made that in the first frame, the location and contour of the object or objects is known to the mode-based multi-hypothesis tracker. In other words, a "sample" denoting a particular state space configuration obtained from a prior distribution or prediction scheme is known with respect to the first frame. Any of a number of conventional techniques is used to locate the object in the initial image frame. For example, such techniques include edge detection, the use of color or intensity gradients, manual identification of the initial location, or any other conventional prior distribution or prediction scheme. The mode-based multi-hypothesis tracker then tracks the object or objects throughout the remaining sequence of images in the manner described below.

Given the initial sample, a sequence of image frames is then provided for processing by the mode-based multi-hypothesis tracker. Using this sample, the mode-based multi-hypothesis tracker then determines at least one corresponding mode for an input image frame. In other words, given the initial sample, the mode-based multi-hypothesis tracker identifies one or more "modes" that correspond to local maximums in the distribution. Finally, after using the modes to generate an importance sampling function, and using the importance function for identifying the mode having the highest estimated posterior $p(X_t|Z_t)$, that mode is provided as the current target estimate, and is then used as the "sample" for processing the next sequential image.

In one embodiment, given an initial sample, a number of likely modes are first determined or refined from an image using a conventional "active contour technique" by performing an iterative search in a 2D image plane. Conventional active contour techniques provide a deformable curve, or "snake", which moves over an image while minimizing its potential energy. The energy of a snake can in general be divided into an "internal energy" term constraining the overall shape of the snake, and an "external energy" function provided by the image driving the snake towards a desired boundary. With an appropriate image energy function and careful initialization, an active contour snake can converge effectively to the required boundary, thereby generating one or more modes. Such conventional active contour techniques are well known to those skilled in the art, and will not be discussed in further detail herein, except as they relate specifically to particular aspects of the mode-based multi-hypothesis tracker.

Unfortunately, the modes returned by conventional active contour techniques only represent maximum likelihood estimates as the active contour technique converges on a target object boundary rather than the desired posterior, $p(X_t|Z_t)$. Consequently, the mode-based multi-hypothesis tracker described herein expands on the conventional active contour technique by utilizing the identified modes to generate an "importance sampling function." Samples or "particles" are then drawn from the importance function. Weights for these particles are then computed. Finally, the weighted particles are then used for computing a posterior probability of a tracking state with respect to an image observation for each image frame.

While the aforementioned embodiment is useful for tracking objects, it is not necessarily efficient enough to allow for real-time object tracking using a typical PC-type computer. Consequently, in another embodiment of the mode-based multi-hypothesis tracker, a 1D causal contour model is used in place of the iterative search of the 2D image plane to facilitate efficient sample refinement for identifying the modes for each image frame. As with the iterative search of the 2D image plane, the use of a 1D contour model for identifying the modes for each image frame, is followed by the generation of an importance sampling function, weighting particles drawn from the importance function, and using the weighted particles for computing a posterior probability of a tracking state with respect to an image observation for each image frame. One benefit of using the 1D causal contour model in place of the iterative search of the 2D image plane is that image processing speed in increased to the extent where real-time object tracking is easily feasible on a typical PC-type computer.

Further, in still another embodiment, the robustness of the mode-based multi-hypothesis tracker is improved by a further refinement of the contour model. In particular, the contour model, whether using a 2D model, or the aforementioned 1D causal contour model, is further refined by using a parametric contour as the state space so as to take domain knowledge such as a shape prior into account. Using parametric contours in this manner serves to avoid or further reduce errors resulting from background distraction or discontinuities in the images. For example, in the case of human head tracking, a parametric ellipse is used as the as the state space. Clearly, parametric contours other than ellipses can be used, with the type of parametric contour being chosen that best represents the object or objects being tracked in the images.

Figure 2:
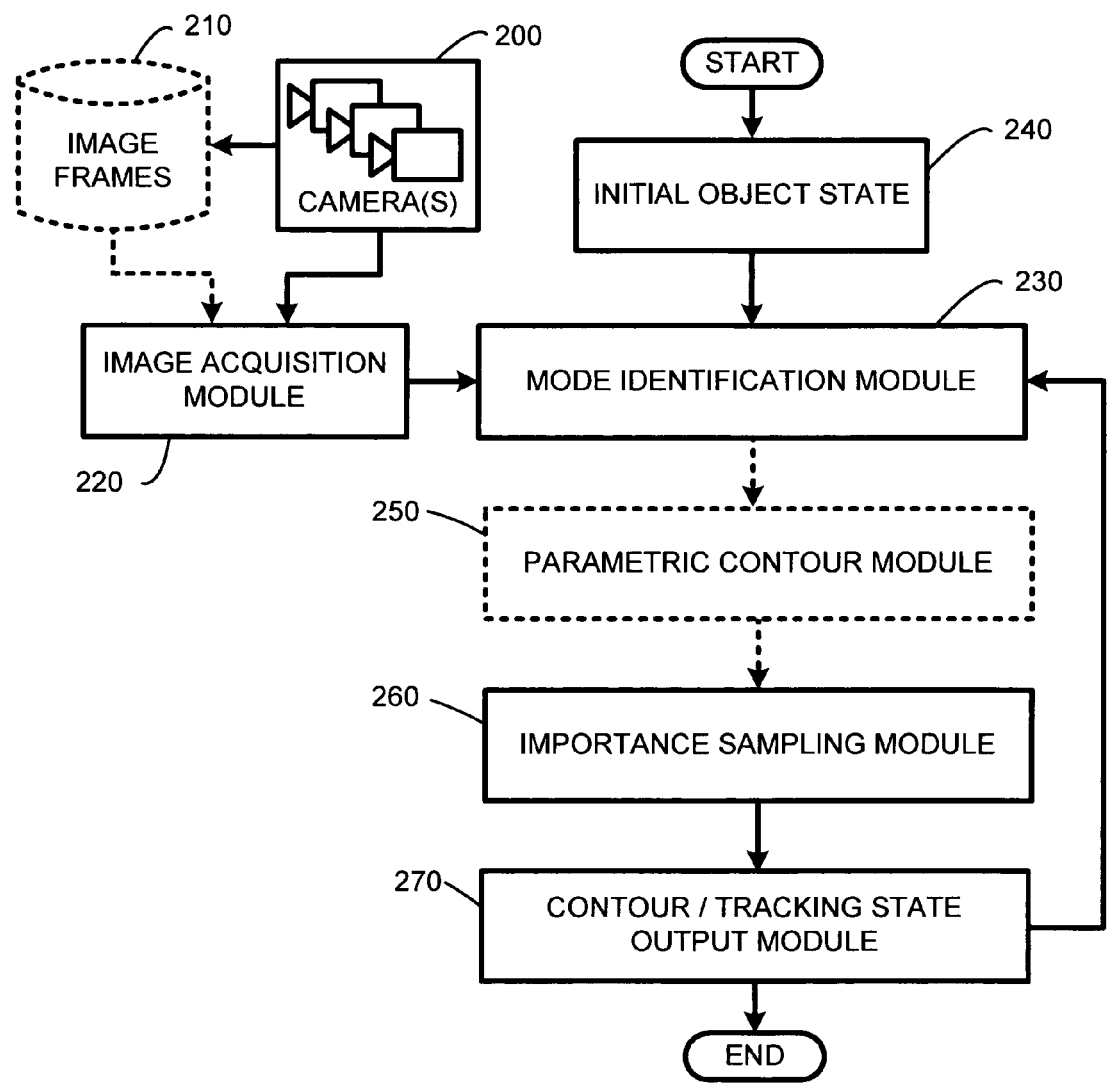
FIG. 2 illustrates an exemplary architectural diagram showing exemplary program modules for using a mode-based multi-hypothesis tracker to track objects.

2.2 System Architecture:

The processes summarized above are illustrated by the general system diagram of FIG. 2. In particular, the system diagram of FIG. 2 illustrates the interrelationships between program modules for implementing object tracking using a mode-based multi-hypothesis tracker. It should be noted that the boxes and interconnections between boxes that are represented by broken or dashed lines in FIG. 2 represent alternate embodiments of deghosting methods described herein, and that any or all of these alternate embodiments, as described below, may be used in combination with other alternate embodiments that are described throughout this document.

In particular, as illustrated by FIG. 2, a system and method for object tracking using a mode-based multi-hypothesis tracker tracks one or more objects through one or more sequential image frames. To begin one or more cameras 200 provides two or more sequential image frames 210 directly to an image acquisition module 220. Alternately, the image frames 210 are first stored to an image database or file on a computer readable medium 210, which in turn provides the images to the image acquisition 220 module when processing is desired.

In either case, the image acquisition module 220 then provides a current image frame 210 to a mode identification module 230. Initially, the mode identification module 230 also receives an initial object tracking state 240, e.g., the initial "sample" which represents the state space configuration of the object or objects being tracked in the first image frame. As discussed in greater detail below, for processing of subsequent image frames 210, the mode identification module 230 receives the current tracking state or sample which is obtained from the previously analyzed image frame for processing of each subsequent image frame. The mode identification module 230 then determines at least one mode for the current image frame 210 by using an active contour approach which performs an iterative search using a 2D contour model in a 2D image plane to identify modes that correspond to local maximums in the distribution. As noted above, each mode represents a possible state space configuration of the object or objects being tracked.

In another embodiment, as used in a working example of the mode-based multi-hypothesis tracker, the mode identification module 230 uses a 1D causal contour model in place of the iterative search of the 2D image plane to facilitate efficient sample refinement for identifying the modes for each image frame. In general, the 1D causal contour model significantly decreases the time needed to identify modes by restricting contour searching for mode identification to a set of normal lines of the contour of current sample with respect to the current image frame. Specific details of mode identification, using either the 2D model, or the 1D causal contour model, are provided below in Section 3.1, and the associated subsections.

Further, as noted above, in still another embodiment, the robustness of the mode-based multi-hypothesis tracker is improved by a further refinement of the contour model. In particular, the contour model, whether using a 2D model, or the aforementioned 1D causal contour model, is further refined in a parametric contour module 250 by using a parametric contour which provides a shape prior for limiting the potential deformation of the contour, thereby avoiding or limiting erroneous evolvement of the contour during the active contour search for modes. Specific details of the use of a parametric contour for limiting potential deformations of the contour during mode identification by the mode identification module 230 are provided below in Section 3.1.4.

To briefly summarize the aforementioned embodiments of the mode identification module 230, the mode identification module identifies modes for the current image frame 210 using an active contour approach in one of four ways: 1) using a 2D image model; 2) using a 2D image model with a parametric contour acting as a limiting shape prior; 3) using a 1D causal contour model; and 4) using a 1D causal contour model with a parametric contour acting as a limiting shape prior. Again, specific details of mode identification, using any of the aforementioned embodiments, are provided below in Section 3.1, and the associated subsections.

Once the mode identification module 230 has identified the modes for the current image frame 210 using any the aforementioned alternate embodiments of the mode identification module, an importance sampling module 260 then uses the identified modes to generate an "importance sampling function." The importance sampling module 260 uses a novel application of a conventional technique known as importance sampling to allow for the estimation of a posterior probability when using MHT for tracking objects in sequential image frames. In general, the importance sampling module 260 generates an importance function for each image frame 210. This importance function is generated using best-fit contours representing modes within the neighborhood of a number of samples drawn from a prior distribution for the previous image frame 210. Next, once the importance function has been generated, a number of particles are drawn from the importance function, weighted, and used to estimate a probabilistic tracking result, e.g., $p(X_t|Z_t)$, for the current image frame. Specific details of how importance sampling is applied to the MHT tracking system are provided below in Section 3.2, and the associated subsections.

Finally, after using the modes to generate an importance sampling function, and using the importance function for identifying the mode having the highest estimated posterior $p(X_t|Z_t)$, that a tracking state output module 270 outputs the current target state estimate, e.g., a "sample" for the current image frame 210. Further, the tracking state output module 270 provides this "sample" to the mode identification module 220 for use with the next sequential image frame 210 for probabilistically tracking the object or objects within the next sequential image frame as summarized above.

3.0 Operation Overview:

The system and method described herein for object tracking using a mode-based multi-hypothesis tracker is applicable to tracking objects in sequential images including still images, video images, scanned photographic images, and sequential images acquired via film or digital cameras, etc. However, for ease of explanation, the detailed description provided herein will simply address the images, however acquired, simply as sequential images. In general, the above-described program modules are employed in a mode-based multi-hypothesis tracker for automatically tracking objects in two or more sequential images. This process is depicted in the flow diagram of FIG. 6 following a detailed operational discussion of exemplary methods for implementing the aforementioned programs modules.

In general, the mode-based multi-hypothesis tracker uses an adaptation of MHT tracking which is cast in an importance sampling framework for estimating a posterior probability of a tracking state with respect to an image observation. The following sections describe in detail the operational elements for implementing the mode-based multi-hypothesis tracker using the processes summarized above.

3.1 Causal Contour Model for MHT:

As noted above, in describing the mode-based multi-hypothesis tracker, the term "sample" is used to denote a state space configuration obtained from some prior distribution or prediction scheme. In addition, the term "mode" is used to denote a refined "sample" that corresponds to a local maximum in the distribution. Note that both "sample" and "mode" represent a particular configuration of parameters in the state space.

To refine an initial contour (a sample) to the best local contour (a mode), a conventional active contour technique uses a 2D contour model to perform an iterative search for modes in a 2D image plane. However, as noted above, identification of modes using an iterative search in the 2D image plane is inefficient for real-time tracking. Further, because the traditional active contour is non-parametric, it can easily be distracted by background clutter, and more importantly, it is not in a ready-to-use form for MHT.

Consequently, in a working example of the mode-based multi-hypothesis tracker a novel a novel causal 1D contour model is used to facilitate efficient sample refinement. While in a further embodiment, a parametric contour, such as, for example, an ellipse, is used as the state space for using domain knowledge such as a shape prior to avoid background distraction. These concepts are discussed in detail in the following sections.

Figure 3:
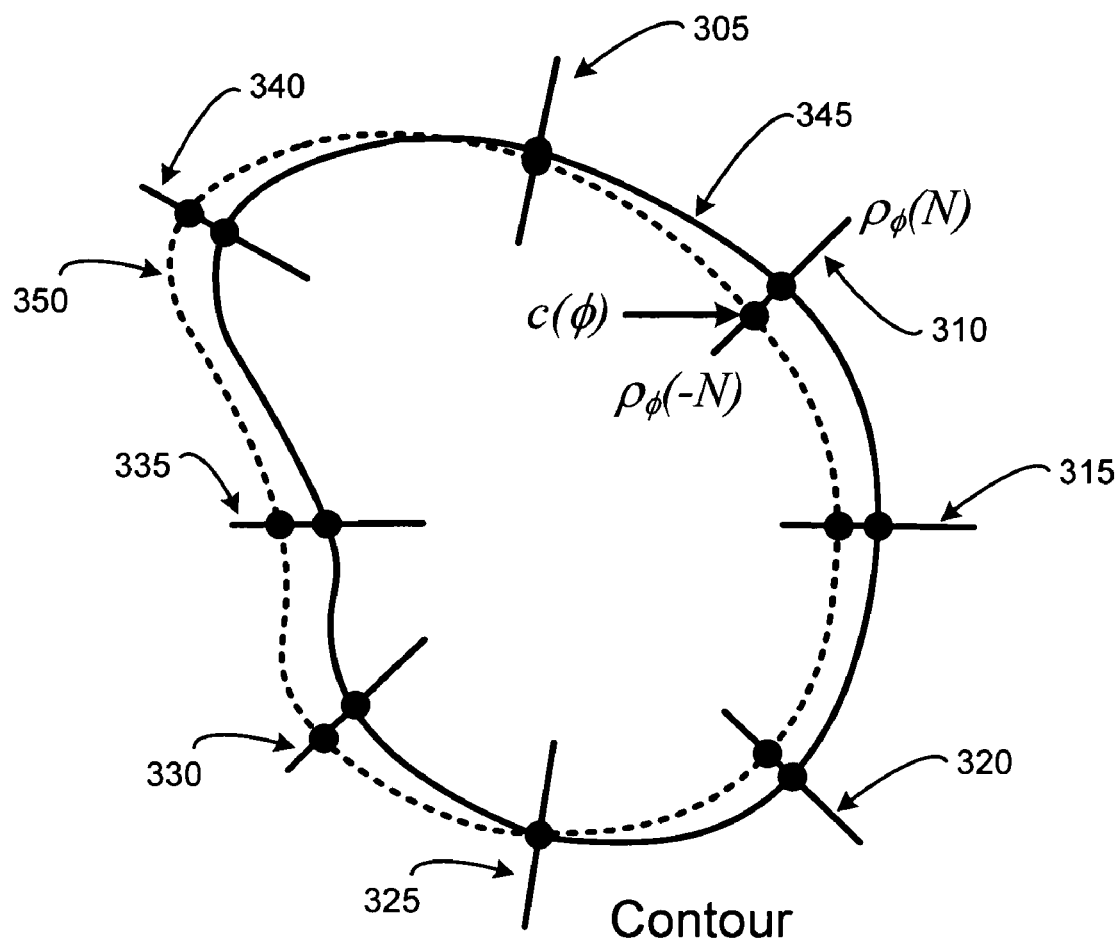
FIG. 3 illustrates an exemplary 1D contour model as used by a mode-based multi-hypothesis tracker to track objects in an image frame.

3.1.1 1D Contour Representation:

The basic premise of the mode-based multi-hypothesis tracker described herein is that given a sample, it is desired to find its corresponding mode, i.e., the best contour within the vicinity of that sample. However, because of the well-known "aperture effect," only the deformations along the normal lines of a contour can be detected. Consequently, active contour searching can be restricted to a set of normal lines of the contour as illustrated in FIG. 3. Specifically, let $\phi$, $\phi=1, \ldots, M$, be the index of the normal lines, 305 through 340, and $\lambda$, $\lambda=-N, \ldots, N$, be the index of pixels along a normal line. Furthermore, let $\rho_\phi(\lambda)$ denote the image intensity at pixel $\lambda$ on line $\phi$. In other words, $\rho_\phi(\lambda)=I(x_{\lambda\phi}, y_{\lambda\phi})$, where $(x_{\lambda\phi}, y_{\lambda\phi})$ is the corresponding image coordinate of pixel $\lambda$ on line $\phi$ and $I(x_{\lambda\phi}, y_{\lambda\phi})$ is the image intensity.

Each normal line, 305 through 340, has 2N+1 pixels, which are indexed from −N to N. The center point of each normal line is placed on the initial contour 345 (the sample) and indexed as 0. Let $c(\phi)$ denote the best local contour 350 (the mode) location on line $\phi$. If all modes, $c(\phi), \phi\in[1,M]$ can be detected, then the best local contour can be obtained. Note that instead of representing the contour by a 2D image coordinate, i.e., $(x_{\lambda\phi}, y_{\lambda\phi})$, it is instead represented by a much simpler 1D function, $c(\phi), \phi=1, \ldots, M$.

3.1.3 Efficient Contour Refinement:

If the initial contour matched the best local contour exactly, the detected contour points on all normal lines would have been exactly at the center, i.e., $c(\phi)=0$, $\forall\phi\in[1, M]$. However, in practice, the best local contour $c(\phi)$ is actually located based on measurements. In the traditional active contour scheme, this is achieved by optimizing an objective function which favors a smooth contour along pixels having sharp intensity changes using a slow iterative search. However, to provide for a more efficient optimization a contour smoothness constraint is defined in a causal way for the objective function as described below in Section 3.1.3.2. The optimal contour can therefore be found by a single iteration of dynamic programming rather than an iterative search through a 2D search plane. The objective function and the optimization procedure are described below.

3.1.3.1 Edge Likelihood Term:

As is well known to those skilled in the art, contour points are likely to be signified by large color or intensity changes. Consequently, edge likelihood is chosen as a term in the objective function. The edge likelihood is represented in energy form, which is typically referred to as the "external energy" in the parlance of active contour techniques. The edge likelihood of pixel $\lambda$ on line $\phi$, $E_e(\rho_\phi, \lambda)$, can therefore be computed as a function of the image gradient along the direction of the line:

$$E_e(\lambda_\phi) = g\left(-\left|\frac{d}{d\lambda_\phi}\rho_\phi(\lambda_\phi)\right|^2\right) \approx g(-(\rho_\phi(\lambda_\phi+1)-\rho_\phi(\lambda_\phi))^2) \quad \text{Equation 1}$$

where g(.) is an appropriate monotonically increasing function. The use of such monotonically increasing functions in an active contour technique are well known to those skilled in the art, and will not be discussed in further detail herein. Assuming that the initial contour is relatively accurate, the objective function is further refined by putting a zero-mean Gaussian kernel at the center of the normal line (see FIG. 3). Therefore, an extra energy term, which favors the edge points in the center part of the normal line is defined as:

$$E_s(\lambda_\phi)=\lambda_\phi^2/\sigma_s^2 \quad \text{Equation 2}$$

where $\sigma_s$ controls how strong this constraint should be. For example, when the motion of the object is difficult to predict or no accurate motion model can be obtained, the $\sigma_s$ should be large enough to incorporate uncertainties, thereby lowering the influence of this constraint.

Because the above edge detection scheme only examines each normal line individually, it does not have enough information to ensure good overall contour detection results in cluttered environments. Consequently, in another embodiment, the relationship between contour points on adjacent normal lines is taken into account. In particular, if the normal lines are relatively dense (e.g., about 20-60 normal lines were used in a working example of the mode-based multi-hypothesis tracker) it can be seen from FIG. 3 that the best local contour points on adjacent normal lines tend to have a similar amount of displacement from the initial contour points (indexed as 0 on each normal line). Therefore, this inter-normal-line correlation is effectively modeled by a smoothness constraint as described below.

3.1.3.2 Causal Smoothness Constraint:

The contour smoothness constraint has been used in many well known conventional active contour models. It is achieved by defining an "internal energy" term to penalize the roughness of a contour. In the traditional active contour snake model, the roughness is characterized by the first and second derivatives of the contour. Because the first and second derivatives of the current contour point depend on the contour points both before and after it, this representation of the smoothness constraint is not causal, and the best local contour can only be obtained iteratively. For real-time tracking of objects, it is imperative to have an efficient contour refinement process. Consequently, building on the aforementioned 1D contour model, the smoothness constraint is defined in a causal way, thereby allowing for rapid contour refinement:

$$E_i(\lambda_{\phi-1}, \lambda_\phi) = |\lambda_\phi - \lambda_{\phi-1}|^2 \quad \text{Equation 3}$$

This causal definition allows for the design of a very computationally efficient contour refinement process, as described in Section 3.1.3.3, for obtaining the best local contour in a single iteration.

Given the aforementioned constraints, the total objective function of any given contour $c(\phi)$, $\phi=1, \ldots, M$ is defined as follows:

$$E(c(\phi)) = \sum_{\phi=0}^{M} (\alpha_i E_i(c(\phi - 1), c(\phi)) + \alpha_e E_e(c(\phi)) + \alpha_s E_s(c(\phi))) \quad \text{Equation 4}$$

where $\alpha_i$, $\alpha_e$ and $\alpha_s$ are appropriate weights for each of the energy terms. As with conventional active contour techniques, the best local contour is the $c(\phi)$, $\phi=1, \ldots, M$ that gives the minimum total energy. Because, as noted above, on each normal line there are $2N+1$ locations for $c(\phi)$, a brute force approach would require $(2N+1)^M$ tries before finding the best contour. However, given the aforementioned causal definition of the smoothness constraint, it is possible to find the best local contour efficiently by using a dynamic programming method as described in the following section.

3.1.3.3 Energy Minimization—Finding the Modes:

To obtain the best local contour (the mode) using dynamic programming, the optimization process is divided into multiple stages, starting from $\phi=0$ to $\phi=M$. If the total energy ($E^o(\lambda_\phi)$) of the best contour ending at point $\lambda_\phi$ is known, it can be propagated to every point on line ($\phi+1$) to compute the total energy for $\lambda_{\phi+1}$ ($E^o(\lambda_{\phi+1})$). This dynamic programming propagation process can be explained as follows:

$$E^0(\lambda_{\phi+1}) = \min_{\lambda_\phi \in [-N,N]} \{E^0(\lambda_\phi) + \alpha_i E_i(\lambda_\phi, \lambda_{\phi+1})\} + \alpha_e E_e(\lambda_{\phi+1}) + \alpha_s E_s(\lambda_{\phi+1}), \lambda_{\phi+1} \in [-N, N] \quad \text{Equation 5}$$

After the energy is propagated to the last line $\phi=M$, the best contour is obtained by first finding the minimum energy point on line M, $\min_{\lambda \in [-N,N]} E^o(\lambda_M)$, and then back-tracking through all the lines to obtain the corresponding contour points on each line. Note that this approach reduces the computational complexity from the aforementioned brute force approach requiring $(2N+1)^M$ computations to the dynamic programming propagation approach which only requires $(2N+1)^2 M$ computations. Clearly, using the dynamic programming propagation process a massive reduction in computational complexity is achieved as M increases.

In summary, unlike the traditional active contour scheme, the causal 1D contour model allows the best contour to be obtained without iteratively searching the 2D image plane. Note that the best contour (the mode) is with respect to a given initial contour (the sample). Further, if two samples are far from each other, the modes obtained can be quite different, which fits perfectly into the MHT tracking framework.

3.1.4 Shape Prior—Parametric Contours:

As noted above, in another embodiment, the use of parametric contours is used to improve tracking by limiting the potential deformations of the contour. In particular, the preceding discussion focused on embodiments wherein the tracking contour was in a non-parametric form such that each individual contour point can move arbitrarily, as long as the overall contour minimizes the objective function as required by Equations 4 and 5. In other words, given a non-parametric contour, the contour can deform to virtually any shape. Because of its high degree of freedom, this non-parametric representation is both susceptible to background clutter and not easily used in an MHT tracking framework.

Consequently, the concept of using a parametric contour for representing the target object of interest is added in one embodiment. Note that the particular parametric contour which is used for modeling the target object of interest is dependent upon the general shape of the target object of interest. For example, as is well known to those skilled in the art, because human heads are roughly elliptical regardless of the head orientation, the human head can be effectively modeled by a parametric ellipse. Consequently, a parametric ellipse was used in a working example of the mode-based multi-hypothesis tracker. This domain knowledge, i.e., shape prior, helps the contour to avoid erroneous evolvement, therefore greatly improving the tracking results. This concept is illustrated by FIGS. 4A through 4F which illustrate tracking results of a working example of the mode-based multi-hypothesis tracker using a parametric ellipse as a shape prior. Note that FIGS. 4A through 4F are discussed in greater detail below. Further, the use of a parametric contour, such as the parametric ellipse represents a state space whose samples and modes can be readily used in an MHT framework.

Specifically, in the working example of the mode-based multi-hypothesis tracker a five dimensional parametric ellipse was used to represent the head contour:

$$X = [x_c, y_c, \alpha, \beta, \phi] \quad \text{Equation 6}$$

where $(x_c, y_c)$ is the center of the ellipse, $\alpha$ and $\beta$ are the lengths of the major and minor axes of the ellipse, and $\phi$ is the orientation of the ellipse. Note that the initial samples are always ellipses. However, after the aforementioned refinement process, the identified modes are not necessarily ellipses any more. Consequently, a least mean square (LMS) technique is used to fit the modes to the five-dimensional ellipse state space before producing the tracking results.

3.2 Mode-Based Multi-Hypothesis Tracking:

As noted above, one of the major limitations with conventional MHT schemes is that such schemes only produces maximum likelihood estimates, but not the desired posterior, $p(X_t|Z_t)$. Consequently, as noted above, the conventional MHT approach is modified by casting the MHT tracking system in an importance sampling framework in order to estimate the posterior from MHT by using importance sampling. Construction and use of an importance function for importance sampling is described in the following sections. The concepts embodying importance sampling are well known to those skilled in the art. Consequently, importance sampling will be described below only so far as to describe its implementation for estimating the posterior probability with respect to MHT tracking.

3.2.1 Constructing the Importance Function:

Let q be a known proposal distribution (also called the importance function). As is well known to those skilled in the art, it has been proven that as I tends to infinity, the unknown posterior distribution p can be approximated by a set of property weighted particles drawn from a known importance function q:

$$\hat{p}(X_t | Z_t) = \sum_{i=1}^{I} \pi_t^i \delta_{X_t^i}(dX_t) \qquad \text{Equation 7}$$

Where I is the number of particles, $\delta$ is the Dirac delta function, and the weights for the particles are calculated as:

$$\pi_t^i = \frac{p(X_t^i | X_{t-1}^i)}{q(X_t^i | X_{t-1}^i, Z_t)} \cdot p(Z_t | X_t^i) \qquad \text{Equation 8}$$

The process of drawing particles $X_t^i$ from the importance function q and calculating the particle weights $\pi_t^i$ is called importance sampling. There are an infinite number of choices for the importance function, as long as its support includes that of the posterior distribution. However, when q is close to the true posterior p, the particles are more effective. Consequently, as is known to those skilled in the art, the basic idea is to put more particles in those areas where the posterior may have a higher density so as to avoid relatively useless particles. The mode-based MHT fits into this importance sampling framework very well.

In describing the use of importance sampling as applied to MHT tracking, several terms are defined for purposes of clarity. In particular, $X_t$ is used herein to denote a general state variable, as used in Equations 7 and 8. Furthermore, let $\bar{X}_t^k$, k=1, . . . , K, denote the raw samples drawn from a prior distribution, and let $\tilde{X}_t^l$, l=1, . . . , L, denote the modes refined from the raw samples. Note that because of the refinement process described above in Section 3.1.3, the best contour obtained is not necessarily an ellipse, or other parametric contour. Consequently, $\hat{X}_t^i$ is used to denote the best contour after fitting the parametric ellipse, (see Equation 6), or other parametric contour.

Given these definitions, modeling each mode as a local Gaussian, and using a mixture of the modes as the importance function, q, gives:

$$q(X_t | X_{t-1}, Z_t) \equiv \frac{1}{L} \sum_{l=1}^{L} N(\tilde{X}_t^l, \sigma_q) \qquad \text{Equation 9}$$

where "≡" denotes "defined as", and $\sigma_q$ is the variance of the Gaussian for the modes. Once the importance function q is constructed, particles $\hat{X}_t^i$, i=1, . . . I, are drawn from it, and used to estimate the posterior probability by using Equations 7 and 8. Note that, to preserve all the L modes in the importance function, the number of particles should be greater than or equal to the number of modes, i.e., I>=L.

Given the importance function q (Equation 9), the probability of a particle $\hat{X}_t^i$ is then evaluated as:

$$q(X_t = \hat{X}_t^i | \tilde{X}_t^l) = \frac{1}{\sqrt{2\pi}\,\sigma_q} \frac{1}{L} \sum_{l=1}^{L} \exp\left(-\frac{(\hat{X}_t^i - \tilde{X}_t^l)^2}{2\sigma_q^2}\right) \qquad \text{Equation 10}$$

Referring back to Equation 8, in order to calculate the particle weights, in addition to evaluating Equation (10), it is also necessary to calculate the particle likelihood $p(Z_t|\hat{X}_t^i)$ and the particle transition probability $p(\hat{X}_t^i|\hat{X}_{t-1}^i)$. These terms are discussed in the following two subsections.

3.2.2 Calculating the Particle Likelihood:

Let $Z_{t,\phi}$ denote the edge detection observation on line $\phi$ at time t. Because of potential background clutter, there can be multiple edges along each normal line. Therefore, let J be the number of detected edges $(Z_{t,\phi}=(Z_1, Z_2, \ldots, Z_j))$. Of the J edges, at most one is the true contour. With the assumption that the clutter is a Poisson process along the line with spatial density $\gamma$ and the true target measurement is normally distributed with standard deviation $\sigma_z$, the edge likelihood model is obtained as follows:

$$p(Z_{t,\phi} | \lambda_\phi = \hat{X}_{t,\phi}^i) \propto 1 + \frac{1}{\sqrt{2\pi}\,\sigma_z q_0 \gamma} \sum_{j=1}^{J} \exp\left(-\frac{(Z_j - \lambda_\phi)^2}{2\sigma_z^2}\right) \qquad \text{Equation 11}$$

where $q_0$ is the prior probability that none of the J edges is the true contour. By assuming independence between different normal lines, the following overall likelihood function is produced:

$$p(Z_t | \hat{X}_t^i) = \prod_{\phi=1}^{M} p(Z_{t,\phi} | \hat{X}_{t,\phi}^i) \qquad \text{Equation 12}$$

3.2.3 System Dynamics and Particle Transition Probability:

As is known to those skilled in the art, the "Langevin process" can be used to model human head movement dynamics. Equation 13 provides a mathematical representation of this movement model:

$$\begin{bmatrix} X_t \\ \dot{X}_t \end{bmatrix} = \begin{bmatrix} 1 & \tau \\ 0 & a \end{bmatrix} \begin{bmatrix} X_{t-1} \\ \dot{X}_{t-1} \end{bmatrix} + \begin{bmatrix} 0 \\ b \end{bmatrix} m_t \qquad \text{Equation 13}$$

where $a=\exp(-\beta_\theta \tau)$, $b=\bar{v}\sqrt{1-\alpha^2}$, $\beta_\theta$ is the rate constant, $m_t$ is a thermal excitation process drawn from Gaussian distribution $N(0, Q)$, $\tau$ is a discretization time step and $\bar{v}$ is a steady-state root-mean-square velocity. Assuming that each particle forms a local Gaussian, the particle transition probability can then be computed as:

$$p(\hat{X}_t^i | \hat{X}_{t-1}) = \frac{1}{\sqrt{2\pi}\,\sigma} \frac{1}{I} \sum_{r=1}^{I} \exp\left(-\frac{(\hat{X}_t^i - \hat{X}_{t-1}^r)^2}{2\sigma^2}\right) \qquad \text{Equation 14}$$

where σ is the variance of the Gaussian kernel.

3.2.4 Overall Importance Sampling Summary:

By formulating MHT in an importance sampling framework, the ability to derive the desired posterior estimates, rather than the maximum likelihood estimates is achieved by the mode-based multi-hypothesis tracker. Once cast into the importance sampling framework, the posterior is represented using the set of particles which are propagated to the next image frame to be analyzed. Further, because the particles are drawn from the mixture of all the modes (i.e., the importance function), the mode-based multi-hypothesis tracker is more robust than single-hypothesis approaches, and can recover quickly after large distractions in the image frames. The preceding operational description can be briefly summarized as follows:

1. Generating the Importance Function:
   a) Given the particle set obtained at from the image frame time t−1, i.e., $\{\hat{X}_{t-1}^i, \lambda_{t-1}^i, i=1, \ldots, I\}$, draw K raw samples $\overline{X}_{t-1}^k$, k=1, . . . , K, from the set. Passing the raw samples through the system dynamics model, as described in Section 3.2.3 with respect to Equation 13, the predicted raw samples $\overline{X}_t^k$ are obtained.
   b) For each raw sample $\overline{X}_t^k$, find the best-fit contour $\tilde{X}_t^i$, i.e., the mode within its neighborhood using the dynamic mode-finding process described above in Section 3.1.3.3. After finding the modes, the importance function is generated using Equation 9.

2. Importance Sampling:
   a) Draw I particles ($\hat{X}_t^i$, i=1, . . . , I ) from the importance function (Equation 9).
   b) Weight the particles using Equations 8, 10, and 12.

3. Output:
   Finally, once all the weights are calculated, the probabilistic tracking result is then estimated with Equation 14 using the newly obtained particle set $\{\hat{X}_t^i, \pi_t^i, i=1, \ldots, I\}$.

3.3 System Operation:

The program modules described in Section 2.2 with reference to FIG. 2, and in view of the detailed description provided in Section 3, are employed for automatically tracking objects in sequential image frames using the mode-based multi-hypothesis tracker. This process is depicted in the flow diagram of FIG. 6. It should be noted that the boxes and interconnections between boxes that are represented by broken or dashed lines in FIG. 6 represent alternate embodiments of the present invention, and that any or all of these alternate embodiments, as described below, may be used in combination.

Figure 6:
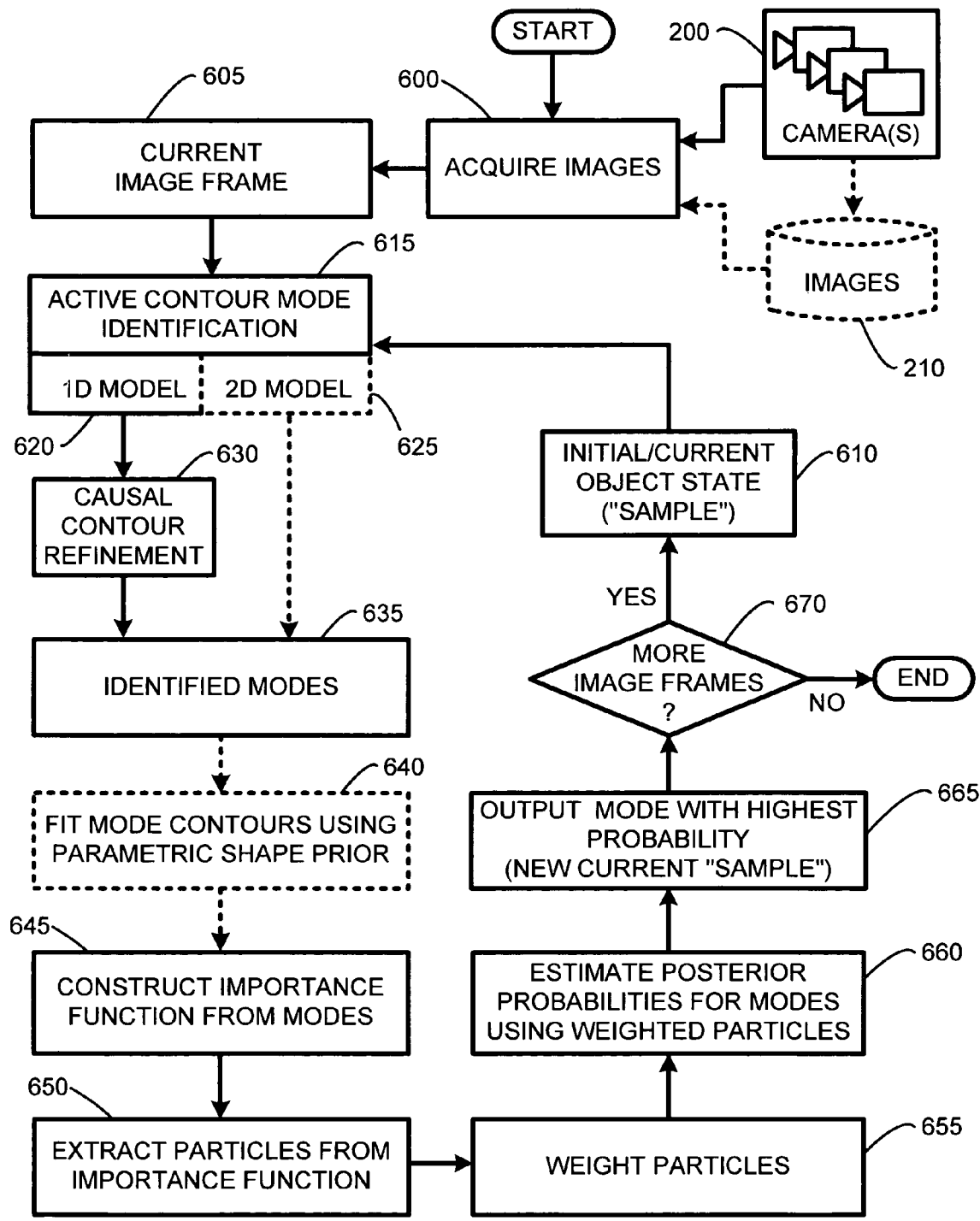
FIG. 6 illustrates an exemplary system flow diagram for using a mode-based multi-hypothesis tracker to track objects.

Referring now to FIG. 6 in combination with FIG. 2, the process can be generally described as a mode-based tracking system which uses multi-hypothesis tracking in combination with importance sampling for estimating a posterior probability of current target state given a prior target state. In particular, as illustrated by FIG. 6, a system and method for automatically tracking an object or objects in a series of sequential image frames begins by acquiring 600 two or more sequential images frames 210 using at least one camera or other imaging device 200. While the mode-based multi-hypothesis tracker is capable of real-time tracking, in one embodiment, the sequential images 210 are stored to a computer file or database for later processing.

In either case, once at least one image has been acquired an active contour identification process 615 uses an initial or current target object state or "sample" 610 along with the current image frame 605 for the purpose of identifying one or more modes representing potential target object states. As discussed above, in one embodiment, the active contour mode identification process uses a 1D contour model 620 (see Section 3.1.1) for identifying modes. Alternately, a 2D model is used by the active contour mode identification process for identifying modes.

Further, in the 1D model case, a causal contour refinement process 630 is used allow for mode identification in a single iteration, rather than with multiple iterations as is the case with conventional active contour techniques (see Section 3.1.3). In either case, whether a 1D, or a 2D model is used, in one embodiment, s the identified modes 635 are fit to model specific parametric contours. For example, in the case of human head tracking, a parametric ellipse was used to model the human head. As noted above, the use of a parametric shape prior serves to limit potential deformations of the mode contours, thereby reducing or eliminating evolvement errors resulting from background clutter (see Section 3.1.4).

Next, an importance function is constructed 645 from the identified modes 635 whether or not the causal contour refinement process 630 has been applied to the mode contours. As described above in Section 3.2.1, this importance function uses a novel application of a conventional technique known as importance sampling to allow for the estimation of a posterior probability when using MHT for tracking objects in sequential image frames. Note that a unique importance function is constructed 645 for each image 210 frame as that image frame is processed. Once the importance function has been generated 645, a number of particles are drawn or extracted 650 from the importance function. These particles are then weighted 655 and used to estimate a probabilistic tracking result, e.g., $p(X_t|Z_t)$, for the current image frame, as described in Sections 3.2.1 through 3.2.4.

Finally, after using the modes to generate the importance sampling function, and using the importance function for estimating mode posteriors, $p(X_t|Z_t)$, the mode having the highest estimated posterior is output 665 as the current target object state. In addition, if there are more image frames to process 670, then the mode having the highest estimated posterior is provided as the new current "sample" 610 in conjunction with the next sequential image frame 210 for identifying modes 610 in that next sequential image frame. The processes described above are then repeated so long as there are more sequential images to process 670.

4.0 Working Example:

In a simple working example of the mode-based multi-hypothesis tracker, a 1D contour model was used along with an elliptical shape prior (see Section 3.1.4) for tracking a human head through a sequence of images. In particular, the 1D model used in this working example used 30 normal lines along the ellipse contour, i.e., M=30 (See Section 3.1.1). Each normal line was 21 pixels long, i.e., N=10, and 20 particles were used during the tracking, i.e., I=20. Given these basic configuration parameters, the mode-based multi-hypothesis tracker was implemented on a typical 933 MHz PC-type computer, with the mode-based multi-hypothesis tracker running at a rate of 10 frames per second.

Note that the configuration described above has no special significance. In fact, the number and length of normal lines, the number of particles used for construction of the importance function, and the frame rate were simply chosen as a matter of convenience. Clearly, these numbers can be increased or decreased as desired in order to address particular tracking objectives.

In this working example, a challenging real-world video sequence in a cluttered environment over a large number of sequential image frames was presented to the mode-based multi-hypothesis tracker described above. The image sequence was designed to simulate various tracking conditions, including appearance changes, quick movement, out-of-plane head rotation, shape deformation, camera zoom in and out, and partial occlusion. Referring to FIG. 4A through FIG. 4F, note that the image frames include horizontal window blinds and a door. These blinds and door represent typical sharp edges and clutter that, in general, tend to impose great challenges to visual tracking algorithms.

As noted above, the mode-based multi-hypothesis tracker is capable of tracking even with severe distractions. In fact, the use of twenty hypotheses (i.e., I=20) were found to be sufficient to successfully track the head throughout the sequence of images. Further, all the five parameters of the parametric ellipse are allowed to change. The tracking results of the mode-based MHT approach is shown in FIG. 4A through FIG. 4F as a while ellipse overlaying the face of the woman in each image frame. Note that the mode-based multi-hypothesis tracker tracks throughout the sequence represented by FIG. 4A through FIG. 4F. Further, in the image frames represented by FIG. 4D through FIG. 4E, the mode-based multi-hypothesis tracker is distracted by partial occlusion, e.g., the tracked head is partially occluded by a second head. However, as illustrated in FIG. 4F, the correct hypothesis emerges even after the severe distraction of the second head, and the mode-based multi-hypothesis tracker then resumes tracking reliably.

Furthermore, to demonstrate the importance of using the parametric contour, a comparison of using the mode-based multi-hypothesis tracker with a 1D model and the elliptical parametric contour was compared against a conventional MHT tracking scheme with a non-parametric contour model. Because of the high degree of freedom in the non-parametric contour, i.e., M=30 vs. the 5D ellipse, the local smoothness constraints are not sufficient to assure the global shape and the contour is easily distracted by the background clutter. For fine-level comparison purposes, the raw contour results are overlaid on the image frames for both methods rather than the fitted ellipse. As shown by the distorted contour overlaying the image frames in FIG. 5D through FIG. 5F, when the person moves across the door from right to left, the sharp edges on the blinds and the door severely distract the conventional MHT tracking scheme with a non-parametric contour model. In contrast, as illustrated by FIG. 5A through 5C the mode-based multi-hypothesis tracker described above maintains a tight contour around the persons face when tracking the person through the exact same frames as those represented by the images of FIG. 5D through FIG. 5F.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for tracking objects in sequential image frames comprising performing steps for:
   acquiring at least two sequential images of a scene that includes at least one object of interest;
   performing an active contour analysis of each sequential image frame for identifying at least one contour in each sequential image frame which corresponds to a local maximum in a distribution of possible states for the object of interest;
   generating an importance function from a sampling of the identified contours for each sequential image frame;
   for each contour, using the importance function to estimate a posterior probability of a tracking state for the object of interest with respect to each image frame; and
   identifying a contour having a highest estimated posterior probability as representing a current tracking state of the object of interest for each sequential image frame.

2. The method of claim 1 further comprising steps for storing the acquired sequential images on a computer readable medium.

3. The method of claim 1 wherein the active contour analysis comprises steps for performing an iterative search of a 2D image plane using a 2D image model for identifying the at least one contour in each sequential image frame.

4. The method of claim 3 further comprising steps for limiting potential deformations of the identified contours by fitting the identified contours to a parametric contour which acts as a limiting shape prior.

5. The method of claim 1 wherein the active contour analysis comprises steps for performing a single iteration analysis of a 1D causal contour model for identifying the at least one contour in each sequential image frame.

6. The method of claim 5 wherein the active contour analysis of the 1D causal contour model comprises steps for determining deformations along at least one normal line of a contour representing a prior state of the object of interest.

7. The method of claim 5 further comprising steps for limiting potential deformations of the identified contours by fitting the identified contours to a parametric contour which acts as a limiting shape prior.

8. A computer-readable medium having computer executable instructions for probabilistically tracking at least one object throughout a sequence of images, said computer executable instructions comprising:
   for each image, extracting at least one contour that represents a local maximum in a distribution that is refined from initial samples in a parametric state space representing an object of interest in each image;
   refining each contour using a parametric causal contour model;
   constructing an importance sampling function from a sampling of the contours for each image;
   estimating a posterior probability of a tracking state for each contour; and
   for each image, choosing a contour having a highest posterior probability as representing a current object state.

9. The computer-readable medium of claim 8 wherein extracting at least one contour from each image comprises performing an active contour search of each image given a prior object state.

10. The computer-readable medium of claim 9 wherein the active contour search comprises performing an iterative search of a 2D image plane representing the image using a 2D contour model of the object.

11. The computer-readable medium of claim 10 further comprising limiting potential deformations of the identified contours by fitting the identified contours to a parametric contour which acts as a limiting shape prior.

12. The computer-readable medium of claim 9 wherein the active contour search is performed using a 1D contour model of the object by determining deformations along at least one normal line of a contour representing a prior state of the object.

13. The computer-readable medium of claim 12 further comprising limiting potential deformations of the identified contours by fitting the identified contours to a parametric contour which acts as a limiting shape prior.

14. The computer-readable medium of claim 8 wherein refining each contour using a parametric causal contour model comprises using a causal smoothness constraint to limit potential roughness of the identified contours.

15. The computer-readable medium of claim 8 further comprising fitting each contour to a parametric contour which is used to model the at least one object prior to constructing the importance sampling function from a sampling of the contours for each image.

16. A system for automatically tracking a human head through at least two sequential image frames, comprising using a computing device to perform the following steps:
capturing at least two sequential image frames of a scene including a human head to be tracked;
providing an initial head state;
using the initial head state for performing an active contour analysis of a first image frame for identifying at least one contour that potentially represents the human head being tracked in the first image frame;
constructing an importance sampling function from the identified contours for the first image frame;
estimating a posterior probability of a tracking state for each identified contour; and
choosing an identified contour having a highest posterior probability as best representing a current object state for the first image frame.

17. The system of claim 16 wherein the identified contour which is chosen as best representing the current object state for the first image frame is used in place of the initial head state in performing an active contour analysis of a subsequent image frame for identifying at least one contour that potentially represents the human head being tracked in the subsequent image frame.

18. The system of claim 17 wherein the active contour analysis comprises an iterative search of a 2D image plane using a 2D image model for identifying the at least one contour in each sequential image frame.

19. The system of claim 18 further comprising limiting potential deformations of the identified contours by fitting each of the identified contours to a parametric ellipse.

20. The system of claim 19 wherein the active contour analysis comprises performing a single iteration analysis of a 1D causal contour model by determining deformations along at least one normal line of a contour representing a prior state of the human head, and limiting potential deformations of the identified contours by fitting each of the identified contours to a parametric ellipse.

* * * * *